United States Patent [19]

Symon

[11] 3,714,284
[45] Jan. 30, 1973

[54] DIMERIZATION OF OLEFINIC COMPOUNDS

[75] Inventor: Ted Symon, Lombard, Ill.

[73] Assignee: Universal Oil Products Company, Des Plaines, Ill.

[22] Filed: Oct. 26, 1970

[21] Appl. No.: 84,209

[52] U.S. Cl.............................260/677 R, 260/666 B
[51] Int. Cl................................................C07c 11/12
[58] Field of Search ...............260/677, 666 B, 680 D

[56] References Cited

UNITED STATES PATENTS

| | | | |
|---|---|---|---|
| 3,541,177 | 11/1970 | Hagihara et al. | 260/677 |
| 3,444,258 | 5/1969 | Kohnle et al. | 260/679 |
| 3,522,321 | 7/1970 | De Young | 260/666 |
| 3,501,540 | 3/1970 | Zuech | 260/666 |

*Primary Examiner*—Delbert E. Gantz
*Assistant Examiner*—J. M. Nelson
*Attorney*—James R. Hoatson, Jr. and Raymond H. Nelson

[57] ABSTRACT

Olefinic compounds, and particularly conjugated diolefinic hydrocarbons, are dimerized in the presence of certain catalytic compositions of matter at dimerization conditions to produce dimers which possess certain specific configurations.

7 Claims, No Drawings

DIMERIZATION OF OLEFINIC COMPOUNDS

This invention relates to a process for the dimerization of unsaturated compounds, and particularly the process for the dimerization of conjugated diolefinic hydrocarbons to produce compounds which are useful in the preparation of aromatic compositions.

Heretofore, many aroma compositions, such as perfumes, have depended, to a great extent, upon naturally occurring compounds which are blended or formulated to prepare final compositions of matter which have a pleasing and pleasant fragrance. For example, perfumes which comprise a mixture of organic compounds which include, for example, alcohols, aldehydes, ketones, esters, and hydrocarbons, are all combined in fixed proportions so that the odors of the fixed compounds will combine to produce a harmonious fragrance. Some of these compounds which are blended have been prepared from rose petals, geranium petals, or other flower petals which possess a distinctive fragrance; and thus, the product thereof, is dependent on nature as pertains to the growing season, the harvesting of crops, as well as climatic conditions which will insure either an abundant crop or may in some instances, insure a poor or sparse crop of the desired flower. Therefore, in order to insure a continued and certain supply of various aromas, it is necessary to synthesize the compounds which possess the desired odor. By utilizing these synthetic compounds in place of the naturally occurring compounds, it is possible to prepare aroma chemicals which may be used in formulations thereafter used in the perfume and soap industry for preparing the formulations which are used to scent soaps, detergents, talcums, perfumes, colognes, etc.

In this respect, it has now been discovered that certain hydrocarbons, and particularly a diolefinic hydrocarbon such as isoprene, may be treated in the presence of certain catalysts of the type hereinafter set forth in greater detail to prepare novel compositions of matter which possess distinctive, desirable, and pleasing odors.

It is therefore an object of this invention to prepare novel compositions of matter hereinafter set forth in greater detail.

A further object of this invention is to provide a process for effecting the polymerization and particularly the dimerization of certain diolefinic hydrocarbons to prepare novel compositions of matter useful in the fragrance field.

In one aspect an embodiment of this invention resides in a process for the dimerization of an olefinic compound which comprises treating said compound at dimerization conditions in the presence of an active catalyst comprising an organo phosphorus ligand-palladium or platinum complex which has been prepared in situ, and recovering the resultant dimer.

A specific embodiment of this invention is found in a process for the dimerization of isoprene which comprises treating isoprene at a temperature in the range of from about 25° to about 250° C. and a pressure in a range of from about atmospheric to about 100 atmospheres in the presence of an active catalyst comprising tetrakis(tri-n-butyl phosphine)palladium(0), which has been prepared in situ, and recovering the resultant 2,7-dimethyl-1,3,7-octatriene.

Other objects and embodiments will be found in the following further detailed description of the present invention.

It has now been discovered that the dimerization of olefinic compounds, and particularly conjugated diolefinic hydrocarbons may be effected in the presence of certain catalytic compositions of matter under dimerization conditions to prepare dimers which possess certain desirable configurations. Heretofore, the catalysts which are required to obtain these particular and specific configurations have been difficult to prepare. For example, one particular type of catalyst which comprises an alkyl phosphine or alkyl phosphite-palladium complex cannot be isolated because it is in liquid form. Furthermore, the preparation of the corresponding aryl complexes is time consuming and, once these are isolated in the active state, they are unstable and tend to decompose due to their sensitivity to heat, light, and oxygen. Due to this non-stability of the catalyst, the process for preparing specific dimers was costly due to the loss of the catalyst. In contradistinction to the aforementioned problem, it has now been discovered that the organo phosphorus ligand-noble metal catalyst complex may be prepared in situ and, due to the stability during the process which is effected in a non-oxygen atmosphere, it is possible to recover the catalyst for reuse thereof. In addition, it has also been discovered that the stability of the catalyst complex may also be enhanced or prolonged by utilizing a mol excess of the organo phosphorus ligand over that of the noble metal portion of the catalyst complex.

The dimerization conditions which are utilized will include temperatures ranging from ambient (about 25° C.) up to about 250° C. or more and at a pressure in the range of from about atmospheric to about 100 atmospheres or more. When utilizing superatmospheric pressure, the desired pressure may be provided for by the introduction of a substantially inert gas such as nitrogen into the reaction vessel, the amount of pressure which is utilized by that which is necessary to maintain a major portion of the reactant in the liquid phase. The reaction time during which the dimerization of the diolefinic hydrocarbon is effected may range from about 0.5 up to about 24 hours or more in duration, the desired residence time which is required to effect the dimerization being dependent upon a number of variable conditions or factors among which will include the particular diolefinic hydrocarbon which is used as the feed stock, the reaction temperature and the reaction pressure, etc.

The catalytic compositions of matter which are prepared in situ comprise, as hereinbefore set forth, organo phosphorus ligand-nobel metal complexes and will possess the generic formula,

in which R is selected from the group consisting of alkyl, cycloalkyl, aryl, alkaryl, or aralkyl radicals and M is a noble metal selected from the group consisting of platinum and palladium. Examples of organo phosphorus ligands which may be used as one of the starting materials to prepare the desired catalyst complex will include trimethyl phosphite, triethyl phosphite, tri-n-propyl phosphite, tri-n-butyl phosphite, tri-t-butyl phosphite, tri-n-amyl phosphite, tricyclopentyl phosphite, tricyclohexyl phosphite, triphenyl phosphite, tribenzyl phosphite, tri-o-tolyl phosphite, tri-m-tolyl phosphite, tri-p-tolyl phosphite, tri-o-ethylphenyl phosphite, tri-m-ethylphenyl phosphite, tri-p-ethylphenyl phosphite, tri-m-ethylbenzyl phosphite, tri-o-ethylbenzyl phosphite, tri-p-ethylbenzyl phosphite, trimethyl phosphine triethyl phosphine, tri-n-propyl phosphine, tri-n-butyl phosphine, tri-t-butyl phosphine, tri-n-amyl phosphine, tricyclopentyl phosphine, tricyclohexyl phosphine, triphenyl phosphine, tribenzyl phosphine, tri-o-tolyl phosphine, tri-m-tolyl phosphine, tri-p-tolyl phosphine, tri-o-ethylphenyl phosphine, tri-m-ethylphenyl phosphine, tri-p-ethylphenyl phosphine, tri-m-ethylbenzyl phosphine, tri-o-ethylbenzyl phosphine, tri-p-ethylbenzyl phosphine, etc. The other or noble portion of the catalyst complex which is prepared in situ comprises a platinum or palladium salt including platinum chloride, platinum bromide, platinum nitrate, platinum acetate, platinum acetylacetonate, palladium chloride, palladium bromide, palladium nitrate, palladium acetate, palladium acetylacetonate, etc. It is also contemplated within the scope of this invention that when using inorganic metal noble salts such as the chlorides, bromides, nitrates, etc., a potassium or sodium salt such as potassium acetate, sodium acetate, potassium carbonate, sodium carbonate, is also utilized. The catalyst composite is prepared in situ by charging the two components to the reaction vessel which contains the conjugated diolefin to undergo dimerization in an amount so that the two components of the catalyst complex are present in a mol ratio of from about 2:1 up to about 10:1 mols of organo phosphorus ligand per mol of noble metals. As was hereinbefore set forth stability of the catalyst complex is enhanced by the presence of an excess of the organo phosphorus ligand, said ligand acting to deter or prevent the deposition of metallic platinum or palladium out of the complex, thus destroying the activity of the catalyst complex.

Examples of catalyst complexes which are prepared in situ will include tetrakis(trimethyl phosphine)palladium(0), tetrakis(triethyl phosphine)palladium(0), tetrakis(tri-n-butyl phosphine)-palladium(0), tetrakis(tri-n-octyl phosphine)palladium(0), tetrakis(triphenyl phosphine)palladium(0), tetrakis(tribenzyl phosphine)palladium(0), tetrakis(tricyclohexyl phosphine)palladium(0), tetrakis(trimethyl phosphite)palladium(0), tetrakis(triethyl phosphite)palladium(0), tetrakis(tri-n-butyl phosphite)palladium-(0), tetrakis(tri-n-octyl phosphite)palladium(0, tetrakis(triphenyl phosphite)palladium(0), tetrakis(tribenzyl phosphite)-palladium(0), tetrakis(tricyclohexyl phosphite)palladium(0), tetrakis(trimethyl phosphine)platinum(0), tetrakis(tri-n-butyl phosphine)platinum(0), tetrakis(triphenyl phosphine)platinum(0), tetrakis(tricyclohexyl phosphine)platinum(0), tetrakis(triethyl phosphite)platinum(0), tetrakis(tri-n-octyl phosphite)platinum(0), tetrakis(tribenzyl phosphite)platinum(0), etc.

If so desired, the dimerization of the diolefinic hydrocarbon may be effected in the presence of a solvent. In the preferred embodiment of the invention, the solvent system which is used comprises a methyl ketone, dimethyl ketone (acetone), being preferred due to its greater availability and relative lower cost. Other methyl ketones which may be also utilized as solvents include methylethyl ketone, methyl-n-propyl ketone, methylisopropyl ketone, methyl-n-butyl ketone, methyl-t-butyl ketone, etc. Other types of solvents which may be used will include methyl acetate, ethyl acetate, propyl acetate, methyl propionate, ethyl propionate, 1,2-dimethoxyethane, 1,2-diethoxyethane, etc., although not necessarily with equivalent results.

The process of this invention may be effected in any suitable manner and may comprise a batch or continuous type operation. For example, when a batch type operation is used, a quantity of the diolefinic hydrocarbon which is to undergo dimerization is placed in an appropriate apparatus which may comprise either a flask or an autoclave of the rotating or mixing type. In addition, if so desired, the reaction vessel will also contain a solvent of the type hereinbefore set forth. Following this, the two components of the catalyst complex system comprising an organo phosphorus ligand and a platinum or palladium salt are also placed in the reaction vessel. The vessel is then heated to the desired operating temperature and, if so desired, superatmospheric pressure, for a predetermined residence time. Following this, the vessel is allowed to return to room temperature, any excess pressure is discharged and the reaction mixture is recovered. Separation from the catalyst complex system is effected by either filtration, if the catalyst system is solid, or distillation under reduced pressure, if the catalyst system is in liquid form. The remainder of the reaction mixture is then subjected to conventional means of separation and purification whereby the desired dimer containing a specific and selective configuration is recovered.

It is also contemplated within the scope of this invention that the process of this invention in which the catalyst complex is prepared in situ may be effected in a continuous manner of operation. When such a type of operation is used, the conjugated diolefinic hydrocarbon and the solvent are continuously charged to the reaction zone which is maintained at the proper operating conditions of temperature and pressure. In addition, the organo phosphorus ligand and the platinum or palladium salt are also continuously charged to the reaction zone, Upon completion of the desired residence time, the reactor effluent is continuously withdrawn from the reactor and again subjected to conventional means of separation whereby the catalyst and unreacted starting materials are recycled to the reaction zone and the desired dimer of a specific configuration is recovered for storage.

In both the batch type and continuous type of operation, the reaction is preferred carried out in an oxygen-free atmosphere which is effected by purging the apparatus with nitrogen prior to the introduction of the starting materials in the catalyst thereafter charging the dimer, the solvent and the catalyst components of the complex to the reactor in a nitrogen atmosphere. By utilizing the oxygen-free atmosphere and by utilizing a mol excess of the organo phosphorus ligand over the platinum or palladium salt and by preparing the catalyst complex in situ, it is possible to obtain a yield of the desired dimer which is in excess over the amount which might be expected to be present in an equilibrium system as well as maintaining the activity of the catalyst complex.

The following examples are given to illustrate the process of the present invention which, however, are not intended to limit the generally broad scope of the present invention in strict accordance therewith.

EXAMPLE I

In this example 25 cc. of isoprene and 15 cc. of acetone were charged to a Fisher-Porter apparatus which had been purged with nitrogen prior to the charging of the materials thereto. The catalyst complex was then formed in situ by adding 2 mmols of palladium acetylacetonate and 10 mmols of tricyclohexyl phosphite to the apparatus. The apparatus was then sealed and heated to a temperature of 119°–120° C. for a period of 2.5 hours. At the end of this time, heating was discontinued and the apparatus allowed to return to room temperature. The reaction mixture was recovered, separated from the catalyst and subjected to analysis by means of a gas-liquid chromatograph. There was an 84 percent conversion of the isoprene to the dimer thereof. The isomer distribution consisted of 85 percent of the 2,7-dimethyl-1,3,7-octatriene and 15 percent of the 2,6-dimethyl-1,3,7-octatriene.

Example II

A charge stock consisting of 15 cc. of acetone and 25 cc. of isoprene was charged to a nitrogen purged Fisher-Porter apparatus. Following this a catalyst complex was formed in situ by adding 2 mmols of palladium acetylacetonate and 10 mmols of tri-n-butyl phosphine. The apparatus was sealed and heated to a bath temperature of 119°–120° C. for a period of 3 hours. At the end of this time, heating was discontinued and the apparatus allowed to return to room temperature. The apparatus was opened and the reaction mixture recovered therefrom. After separation from the catalyst complex, the product was subjected to gas-liquid chromatographic analysis. This analysis showed a 96 percent conversion of isoprene to the dimer thereof, the product distribution consisting of 87 percent of the 2,7-dimethyl-1,3,7-octatriene and 13 percent of the 2,6-dimethyl-1,3,7-octatriene.

EXAMPLE III

Another experiment was performed in which 25 cc. of isoprene and 15 cc. of acetone were charged to a sealed nitrogen purged Fisher-Porter apparatus. The desired catalyst complex was then prepared in situ by also charging 2 mmols of palladium acetylacetonate and 10 mmols of tri-n-octyl phosphine to the sealed apparatus. The apparatus was then heated to a temperature of 115° C. for a period of 4.5 hours. At the end of this time, heating was discontinued and after the apparatus had returned to room temperature, the reaction mixture was recovered. The product was separated from the catalyst and subjected to gas-liquid chrometographic analysis. This analysis disclosed a 92 percent conversion of the isoprene to the dimer thereof, the dimer consisting of 85 percent of the 2,7-dimethyl-1,3,7-octatriene isomer and 15 percent of the 2,6-dimethyl-1,3,7-octatriene isomer.

EXAMPLE IV

A charge stock consisting of 15 cc. of acetone and 25 cc. of 1,3-butadiene is charged to a nitrogen purged Fisher-Porter apparatus. The desired catalyst complex is then prepared in situ by charging 2 mmols of platinum acetylacetonate and 10 mmols of tribenzyl phosphite to the apparatus. After heating the apparatus to a temperature of 120° C. and maintaining said apparatus at this temperature for a period of 3.5 hours, heating is discontinued, the apparatus is allowed to return to room temperature and the reaction mixture is recovered. After separation from the catalyst, the product is subjected to gas-liquid chromatographic analysis, said analysis disclosed the presence of 1,3,7-octatriene.

I claim as my invention:

1. A process for the dimerization of a conjugated diolefinic hydrocarbon which comprises forming a mixture of reactants consisting essentially of said hydrocarbon, a hydrocarbyl phosphite or phosphine and a platinum or palladium salt in amounts to form a catalyst complex having a mol ratio of from about 2:1 to about 10:1 mols of organo phosphorus ligand per mol of platinum or palladium, and heating said mixture at a temperature in the range of from about 25° to about 250° C. and a pressure in the range of from about atmospheric to about 100 atmospheres, for a sufficient time to form said catalyst complex and to dimerize said hydrocarbon.

2. The process as set forth in claim 1 in which said catalyst complex is tetrakis(tricyclohexyl phosphine)palladium(O).

3. The process as set forth in claim 1 in which said catalyst complex is tetrakis(tri-n-butyl phosphine)palladium (O).

4. The process as set forth in claim 1 in which said catalyst complex is tetrakis(tribenzyl phosphite)platinum(O).

5. The process as set forth in claim 1 in which said catalyst complex is tetrakis(tri-n-octyl phosphine)palladium(O).

6. The process as set forth in claim 1 in which said olefinic hydrocarbon is isoprene.

7. The process as set forth in claim 1 in which said olefinic hydrocarbon is 1,3-butadiene.

* * * * *